United States Patent [19]

Sun

[11] Patent Number: 5,001,192

[45] Date of Patent: Mar. 19, 1991

[54] POLYMERIC POLYBLEND COMPOSITION

[75] Inventor: Yun C. Sun, Midland, Mich.

[73] Assignee: The Dow Chemical Company, Midland, Mich.

[21] Appl. No.: 269,037

[22] Filed: Nov. 9, 1988

Related U.S. Application Data

[63] Continuation-in-part of Ser. No. 141,170, Jan. 6, 1988.

[51] Int. Cl.$^5$ ...................... C08L 27/06; C08L 27/08; C08L 51/04; C08L 67/02
[52] U.S. Cl. ...................................... 525/076; 525/78; 525/80; 525/84; 525/165; 525/173; 525/174; 525/176; 525/177; 525/199; 525/209; 525/210; 525/221; 525/227; 525/239; 525/240; 525/241
[58] Field of Search .................................. 525/239, 199

[56] References Cited

U.S. PATENT DOCUMENTS

| | | |
|---|---|---|
| 2,459,125 | 1/1949 | Cheyney . |
| 3,108,017 | 10/1963 | Messwarb et al. .................. 525/239 |
| 3,662,028 | 5/1972 | Wineland . |
| 3,678,133 | 7/1972 | Ryan . |
| 3,762,979 | 10/1973 | Hanel et al. . |
| 4,318,937 | 3/1982 | Cientrey . |
| 4,362,834 | 12/1982 | Lefevre et al. . |
| 4,594,394 | 6/1986 | Bezoari . |
| 4,668,740 | 5/1987 | Okano . |

OTHER PUBLICATIONS

"Polymer Blending Can Yield Strong Films", Yun C. Sun, Aug. 1987, Research and Development, pp. 78–81.

Primary Examiner—Jacob Ziegler

[57] ABSTRACT

A polymeric polyblend composition comprising a vinylidene chloride interpolymer, polyvinylchloride, and a compatibilizing amount of a compatabilizing polymer, said polymers being miscible.

25 Claims, No Drawings

POLYMERIC POLYBLEND COMPOSITION

CROSS-REFERENCE TO RELATED APPLICATION

This is a continuation-in-part of application Ser. No. 141,170 filed Jan. 6, 1988.

FIELD OF THE INVENTION

The present invention relates generally to compatibilized and melt processible blends of a vinylidene chloride interpolymer, a polyvinyl halide copolymer and a compatibilizing polymer.

BACKGROUND OF THE INVENTION

Vinylidene chloride interpolymers are well-known for their excellent barrier to mass transport of atmospheric gases and moisture vapor. These interpolymers have limited areas of application, however, because of poor melt processing characteristics. In particular, vinylidene chloride interpolymers in a melt plasticized state have poor heat stability and low melt strength. These same interpolymers, when fabricated, tend to be brittle and have low impact strength.

Similarly, polyvinylchloride (PVC) is well-known for its excellent physical properties. Specifically, PVC is easy to mold, inexpensive and inherently flame-retardant. Unfortunately, PVC resins provide a relatively low degree of barrier to mass transport of atmospheric gases and water vapor when compared to vinylidene chloride interpolymers. Moreover, despite the similar molecular structure of polyvinylidene chloride and PVC, a blend of the two resins is friable due to the lack of adhesion of the respective interfaces.

It is desirable to produce a polymeric composition possessing the desirable properties of both a vinylidene chloride interpolymer and PVC. It is to this goal that the present invention is directed.

SUMMARY OF THE INVENTION

The present invention is a compatibilized polymeric polyblend composition comprising: (A) a vinylidene chloride interpolymer, the interpolymer being formed from a monomer mixture comprising vinylidene chloride in an amount of from about 60 to about 98 weight percent, said weight percents being based on the total weight of the monomer mixture, and at least one monoethylenically unsaturated monomer copolymerizable therewith in an amount of from about 40 to about 2 weight percent, based on the total weight of the monomer mixture;

(B) a polyvinyl halide formed from a monomer mixture of at least 50 weight percent of a halo-substituted ethylenically unsaturated monomer, with the balance being an ethylenically unsaturated monomer copolymerizable therewith; and (C) a compatibilizing amount of a compatibilizing polymer, said compatibilizing polymer being selected from the group consisting of (1) olefin polymers having halogen chemically affixed thereto in an amount of from about 24 to about 44 percent by weight of polymer; (2) vinyl aromatic monomers copolymerized with ethylenically unsaturated mono-or polybasic carboxylic acids and derivatives thereof; (3) a thermoplastic copolyester resin, said thermoplastic copolyester resin being formed from an acidic component, comprising one or more dibasic acids and a polyol component comprising more than one polyhydric alcohol, said polyhydric alcohols having a molecular weight of less than about 300: and (4) a thermoplastic graft copolymer of a rubber substrate and at least one comonomer on the substrate, the substrate having a rubber glass transition temperature below 0° C., and the monomer selected from the group consisting of $C_1$-$C_8$ alkyl acrylates and $C_1$-$C_8$ alkyl methacrylates, provided that the monomer selected is different from the major monomeric component of the rubber substrate.

DETAILED DESCRIPTION OF THE INVENTION

The present invention concerns a polymeric polyblend composition of a vinylidene chloride interpolymer, a polyvinyl halide and a compatibilizing polymer.

For the purposes of this invention, it is understood that the term "vinylidene chloride interpolymer" encompasses both homopolymers, copolymers, terpolymers, etc. of vinylidene chloride. The vinylidene chloride monomer may be copolymerized with at least one monoethylenically unsaturated monomer.

In preparing the monomer mixture, such mixture contains essentially all of the monomer to be polymerized. Vinylidene chloride monomer is present in an amount of at least about 60 weight percent, based on total weight of the monomer mixture. The preferred ranges, as is known to the skilled artisan, are dependent upon the presence and type of ethylenically unsaturated comonomer copolymerized therewith. Generally, the ethylenically unsaturated comonomer will be present in an amount of between about 40 weight percent and 1 weight percent, based on total weight of the monomer mixture.

The amount of ethylenically unsaturated comonomer is maintained below an amount effective to destroy the semicrystalline character of the interpolymer. By "semicrystalline character" it is meant that the interpolymer has between about 5 percent and about 95 percent crystallinity. Crystallinity values depend upon the measuring technique, and as used herein crystallinity is defined by the commonly used density method. See, for example, the discussion by R. A. Wessling, in Chapter 6 of *Polyvinylidene Chloride*, Vol. 5, Gordon and Breach Science Publishers, New York, 1977, the teachings of which are incorporated herein by reference.

Suitable ethylenically unsaturated comonomers copolymerizable with the vinylidene chloride monomer include vinyl chloride, alkyl acrylates, alkyl methacrylates, acrylic acid, methacrylic acid, itaconic acid, acrylonitrile and methacrylonitrile. The alkyl acrylates and alkyl methacrylates are generally selected to have from about 1 to about 8 carbon atoms per alkyl group. Preferably, alkyl acrylates and alkyl methacrylates are selected to have from about 1 to about 4 carbon atoms per alkyl group. The alkyl acrylates and alkyl methacrylates are most preferably selected from the group consisting of vinyl chloride, methyl acrylate, ethyl acrylate and methylmethacrylate.

When the ethylenically unsaturated comonomer employed is vinyl chloride, the vinyl chloride is preferably present in an amount of from about 30 to about 5 percent by weight of interpolymer and the amount of vinylidene chloride is from about 70 to about 95 percent by weight of interpolymer.

When the ethylenically unsaturated comonomer employed is an alkyl acrylate, the alkyl acrylate is preferably present in an amount of from about 15 to about 2 percent by weight of interpolymer and the amount of vinylidene chloride is from about 85 to about 98 percent by weight of interpolymer.

Methods of forming the vinylidene chloride interpolymers suitable for use in the present invention are well-known in the prior art. The vinylidene chloride interpolymer is generally formed through an emulsion or suspension polymerization process. Exemplary of such processes are U.S. Pat. Nos. 2,558,728; 3,007,903: 3,642,743: and 3,879,359: and the methods described by R. A. Wessling, in *Polyvinylidene Chloride*, Gordon and Breach Science Publishers, New York, 1977, Chapter 3: all of which are incorporated herein by reference. Typically, the monomeric materials are emulsified or suspended in an aqueous phase. The aqueous phase contains a polymerization initiator and a surface active agent capable of emulsifying or suspending the monomeric materials in the aqueous phase. The polymerization of the monomeric materials is usually carried out with heating and agitation.

After polymerization is complete, the resulting suspension or emulsion of vinylidene chloride interpolymer has a majority of an aqueous phase. Thereafter, the slurry is cooled down, fed to a dewatering process to remove the water and dried.

To improve the impact resistance of the vinylidene chloride interpolymer, it is blended with the polyvinyl halide monomer and a compatibilizing amount of a compatibilizing polymer. The vinylidene chloride interpolymer is present in the polymeric polyblend composition in an amount of from about 40 to about 95 weight percent, preferably from about 45 to about 90 weight percent and most preferably from about 50 to about 85 weight percent based on the total polyblend weight.

The polyvinyl halide is present in the polymeric polyblend compositions according to the present invention in amounts of from a minimum weight percent of generally about 2, preferably about 5 and most preferably about 8; and a maximum weight percent of generally about 40, preferably about 30 and most preferably about 10, said weight percents being based on the total polyblend weight.

The amount of compatibilizing polymer is suitably from about 3 to about 30 weight percent, preferably from about 5 to about 20 weight percent and most preferably from about 7 to about 12 weight percent, said weight percents being based upon the total polyblend weight.

By "polyvinyl halide" is meant homopolymers and copolymers of halo-substituted ethylenically unsaturated monomers which are capable of entering into an addition reaction polymerization. Suitable monomers include vinyl monohalides such as vinyl fluoride, vinyl chloride, vinyl bromide and vinyl iodide, with vinyl chloride being most preferred.

While it is preferred that the polyvinyl halide be formed from a monomer mixture comprised totally of vinyl halide monomer as described above, the present invention is also intended to include copolymers formed by free-radical addition polymerization of a monomer composition containing a predominant amount, e.g., at least 50 percent, of vinyl halide with the remainder being another ethylenically unsaturated monomer copolymerizable therewith. Preferably, the other ethylenically unsaturated monomer is used in amounts of 20 percent or less by weight and more preferably in amounts of 10 percent or less by weight of the total monomer used in preparing the polymer.

Specific monomer compositions for forming copolymers with halo-substituted ethylenically unsaturated compounds, specifically vinyl chloride, can be illustrated by vinyl chloride and vinyl acetate, vinyl chloride and maleic or fumaric acid esters, vinyl chloride and acrylate or methacrylate ester, vinyl chloride and vinyl alkyl ether. These are given as illustrative examples of the numerous combinations of monomers possible for the formation of copolymers with the halo-substituted ethylenically unsaturated compounds. The present invention includes all such combinations.

Compatibilizing polymers suitable for use in the present invention are selected from the group of partially polar polymers capable of compatibilizing a blend of the vinylidene chloride interpolymer and the polyvinyl halide. The term "compatible" is intended to mean that the polymers, upon mixing, the polymers blend together sufficiently well for a particular purpose. See, *Polymer Blends and Composites*, Manson et al., Plenum Press, pgs. 51–52 (1976), and Polymer Blends, Paul et al., Vol. 1, Academic Press, pgs. 17–19 (1978).

For the purposes of this application the polyblend of vinylidene chloride interpolymer and the polyvinyl halide is considered compatibilized when the polyblend has mechanical properties which are generally better than those suggested by the rule of mixtures. Specifically, the impact strength of the polyblend should be better than suggested by the rule of mixtures in order to say the blend is compatibilized. The oxygen permeability of compatibilized polyblends according to the present invention will have a permeability index of no more than about 5 units, the index being calculated as follows: units are in $(cc \cdot mil)/(100\ in^2 \cdot day \cdot atm)$, wherein cc is the cubic centimeters of oxygen, mil is the sample thickness, $in^2$ is the surface area of the sample, day represents a 24 hour time period, and atm is atmospheric pressure in atmospheres. Preferably the oxygen permeability of compatibilized blends according to the present invention will be less than about 3 units.

Beneficially, the compatibilizing polymer will meet two additional criteria. First, it will be melt processible with the vinylidene chloride interpolymer. Second, it will have a melt index or melt viscosity which is sufficiently close to that of the PVC to allow adequate mixing to occur within a reasonable processing time.

One class of compatibilizing polymers is olefin polymers selected to have a halogen chemically affixed thereto in an amount of from about 24 to about 44 percent by weight of polymer. Of the olefin polymers having halogen chemically affixed thereto, those selected to have chlorine as the halogen are preferred.

The term "olefin polymer" is meant to include olefin homopolymers and olefin interpolymers. Suitable olefin polymers are formed from one or more olefin monomers selected to have from 2 to about 18 carbon atoms.

Beneficial compatibilizing olefin polymers selected to have a halogen affixed thereto include olefin interpolymers formed from at least one mono-olefin monomer having from 2 to 4 carbon atoms and up to 98 weight percent of at least one 1-alkene monomer having from 4 to 18 carbon atoms. A preferred group of olefin interpolymers are those selected to contain at least about 90 mole percent of ethylene and about 10 mole percent of at least one 1-alkene having from 4 to 18 carbon atoms. Exemplary 1-alkenes are 1-butene; octene: 1,7-octadiene and the like. Another preferred olefin interpolymer comprises two mono-olefin monomers selected to have from 2 to 4 carbon atoms. Exemplary of such interpolymers are interpolymers of ethylene and propylene.

The compatibilizing olefin polymers selected to have chlorine as the halogen chemically affixed thereto suitably have a chemically combined chlorine content of from about 24 to about 44 percent by weight of polymer.

The compatibilizing olefin polymers are suitably prepared under the influence of catalyst systems comprising admixtures of strong reducing agents, such as triethyl aluminum, and compounds of groups IV-B, V-B and VI-B metals of the Periodic System, such as titanium tetrachloride, and the like.

Desirable compatibilizing olefin polymers are the chlorinated polyethylenes. Chlorinated polyethylene resins desirable for use with the present invention are prepared by suspension chlorination as disclosed in U.S. Pat. No. 3,454,544, the teachings of which are incorporated herein by reference thereto.

The present invention is not restricted to chlorinated polyolefin resins prepared by suspension or slurry chlorination processes. Solution chlorination and bulk, or fluidized bed, chlorination procedures may also be used, provided the interpolymers produced thereby meet the aforementioned requirements with regard to chlorine content, heat of fusion and melt viscosity.

A second class of compatibilizing copolymers include vinyl aromatic monomers copolymerized with α-or β-unsaturated mono basic acids and derivatives thereof.

Vinyl aromatic monomers include styrene: α-alkyl vinyl aromatic compounds (such as α-methylstyrene, α-ethylstyrene, α-methylvinyltoluene, α-methyldialkylstyrene and the like): ring-substituted alkyl styrenes (such as ortho-, meta-, and para-vinyltoluene, o-ethylstyrene, p-ethylstyrene, 2,4-dimethylstyrene, p-tert-butylstyrene and the like); ring-substituted halostyrenes (such as o-chlorostyrene, p-chlorostyrene, o-bromostyrene, 2,4-dichlorostyrene and the like): ring-alkyl, ring-halo-substituted styrenes (such as 2-chloro-4-methylstyrene, 2,6-dichloro-4-methylstyrene and the like): vinylnaphthalene: vinylanthracene: and the like.

Suitable ethylenically unsaturated carboxylic acid monomers copolymerizable with styrene include α-or or β-unsaturated mono basic acids such as acrylic acid, methacrylic acid, crotonic acid, fumaric acid, maleic acid, itaconic acid and the like. Preferably, the unsaturated carboxylic acid monomer is methacrylic acid.

Desirable results are obtained when from about 65 to about 40 weight percent of the vinyl aromatic monomer is polymerized in the presence of from about 35 to about 60 weight percent of at least one ethylenically unsaturated carboxylic acid monomer copolymerizable therewith, the interpolymer being esterified after preparation thereof.

Desirable results are also obtained when vinyl aromatic monomer is copolymerized with esters of the α- or β-unsaturated mono basic acids disclosed above. Preferably, the copolymer is selected from the group consisting of vinyl aromatic monomer/alkyl acrylate and vinyl aromatic monomer/alkyl methacrylate copolymers wherein the alkyl group is selected to contain from 1 to 8 carbon atoms, preferably, from 1 to 4 carbon atoms. Most preferably the esters include ethylacrylate, butylacrylate, 2-ethylhexylacrylate, methyl methacrylate and the like.

Copolymers of vinyl aromatic monomers and α- or β-unsaturated monobasic acids and derivatives thereof are suitably prepared using technology well-known in the art.

A third class of compatibilizing resins includes copolyesters. As used herein, "copolyester" refers to polyesters whose synthesis employs more than one dibasic acid and/or more than one polyhydric alcohol. The thermoplastic copolyester resins suitable for use in the present invention are formed from an acidic component and a polyol component. The acidic component comprises one or more dibasic acids. The polyol component comprises more than one polyhydric alcohol. As used herein, the term "polyol" refers to a polyhydric alcohol.

Dibasic acids for use in forming the thermoplastic copolyesters include aromatic and aliphatic dibasic acids selected to have from 4 to 20 carbon atoms. Exemplary of dibasic acids suitable for use in the present invention are terephthalic acid, hexanedioic acid, nonanedioic acid, decanedioic acid, dodecanedioic acid and eicosanoic acid. Preferably, the acidic component comprises terephthalic acid alone, or a mixture of terephthalic acid and one or more dibasic acids other than terephthalic acid.

The polyol component suitable for use in forming the thermoplastic copolyester resins comprises more than one polyhydric alcohol. Polyhydric alcohols suitable for use in the present invention are selected to have a molecular weight of less than about 300.

Exemplary of polyhydric alcohols suitable for use in the polyol component of the present invention are the alkylene glycols, alicyclical glycols, polyoxalkylene glycols and aromatic glycols. Exemplary alkylene glycols are those alkylene glycols selected to have from 2 to 20 carbon atoms such as ethylene, 1,2-propylene, trimethylene glycol, 1,4-butane diol, pentane diol, neopentyl glycol, hexamethylene glycol, octamethylene glycol, nonamethylene glycol and decamethylene glycol. Exemplary alicyclic glycols are cyclohexane dimethanol and cyclohexane diethanol. Exemplary polyoxalkylene glycols are diethylene glycols, triethylene glycols and tetraethylene glycol. Exemplary aromatic glycols are the ethylene oxide and propylene oxide adduct of bisphenol A, or the ethylene oxide or propylene oxide adduct of bisphenol sulfone.

Preferably, the polyol component used to form the thermoplastic copolyester resin comprises ethylene glycol and one glycol other than ethylene glycol. In one most preferred embodiment of the present invention, the polyol component used to form the thermoplastic copolyester resin comprises ethylene glycol and 1,4-cyclohexane dimethanol.

Thus, exemplary polyesters and copolyesters suitable for use in the present invention include poly(1,4-cyclohexane dimethylene terephthalate), poly(ethylene-co-1,4-cyclohexane dimethylene terephthalate), poly(butylene terephthalate), poly(1,4-cyclohexane dimethylene terephthalate-co-isophthalate) and the like.

Methods of forming the thermoplastic copolyester resins suitable for use in the present invention are well-known in the art. One suitable method involves the esterification of the acidic component with the polyol component followed by polycondensation reaction of the polymer. Another suitable method employs an ester interchange reaction followed by a polycondensation reaction.

The thermoplastic copolyester resins suitable for use in the present invention must melt at a temperature or over a range of temperatures which renders them melt processible with the vinylidene chloride interpolymer of the present invention. Typically, this means that the thermoplastic copolyester resin suitable for use in the present invention must melt at a temperature or over a range of temperatures of from about 150° C. to about 222° C.

The final class of compatibilizing agents suitable for use in the present invention are thermoplastic graft copolymers. The graft copolymers are produced from a rubber component and graft monomers on the rubber surface.

The rubber components present in the graft copolymers are elastomers having glass transition temperatures below 0° C. Exemplary elastomers are selected from acrylate rubbers, preferably homo- or copolymers of alkyl acrylates containing up to 12 carbon atoms in the ester group which, for possible crosslinking, may be copolymerized with polyfunctional unsaturated monomers; diene rubbers (especially polybutadiene, polychloroprene, polyisoprene), olefin rubbers (such as ethylene polymer, ethylenevinyl acetate copolymers, EPDM rubbers) and silicone rubbers. The elastomers may be uncrosslinked or partially crosslinked or highly crosslinked.

Acrylate rubbers are preferred because of their stability. If an acrlyate rubber is selected as the substrate, the comonomer should be selected from a monomer more compatible with vinylidene chloride interpolymer than the major monomeric component of the rubber substrate.

The acrylate rubber comprises an acrylate of the formula: wherein R' is an alkyl radical containing 1 to 18 carbon atoms, an alkoxyalkyl or alkylthioalkyl radical containing a total of 2 to about 12 carbon atoms, or a cyanoalkyl radical containing 2 to about 12 carbon

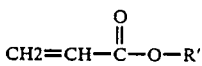

atoms. The alkyl structure can contain primary, secondary or tertiary carbon configurations. Examples of such acrylates are methyl acrylate, ethyl acrylate, propyl acrylate, n-butyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate, n-octadecyl acrylate and the like; methoxymethyl acrylate; methoxyethyl acrylate, ethoxyethyl acrylate, butoxyethyl acrylate, ethoxypropyl acrylate, methylthioethyl acrylate, hexylthioethyl acrylate and the like; and α and β-cyanoethyl acrylate, α-, β- and Y-cyanopropyl acrylate, cyanobutyl acrylate, cyanohexyl acrylate, cyanooctyl acrylate and the like. Often mixtures of two or more monomers and/or types of acrylate monomers are employed.

Preferably the acrylates are selected to have the formula wherein R' is an alkyl radical containing 1 to about 10 carbon atoms or an alkoxyalkyl radical containing 2 to about 8 carbon atoms. Examples of the more preferred acrylates are ethyl acrylate, propyl acrylate, n-butyl acrylate, hexyl acrylate, 2-ethylhexyl acrylate, octyl acrylate and the like, and methoxyethyl acrylate, ethoxyethyl acrylate and the like. Both an alkyl acrylate and an alkoxyalkyl acrylate are used.

The rubber substrates are selected to have a volume average particle diameter within the range of from about 300 Angstroms to about 25,000 Angstroms. Preferably, the particles have a diameter within the range of from about 800 Angstroms to about 20,000 Angstroms.

The rubber substrates may be cross-linked so that they can retain their size and shape during subsequent polymer processing steps. This cross-linking can be achieved during the polymerization of the rubber substrates if a polyfunctional ethylenically unsaturated monomer is included in the polymerization recipe. As used in this disclosure, the term "cross-linked" denotes a polymer which at ambient temperatures is substantially insoluble in such organic solvents as tetrahydrofuran or cyclohexane. The rubber substrates of the present invention may contain up to about 2.0 percent of a cross-linking agent based on the weight of the elastomeric material forming monomer or monomers. The cross-linking agent can be any of the agents conventionally used for cross-linking acrylate rubbers and the like. Suitable examples include divinylbenzene, diallyl maleate, diallyl fumarate, diallyl adipate, allyl acrylate, allyl methacrylate, diacrylates, and dimethyl acrylates of polyhydric alcohols (e.g., ethylene glycol dimethacrylate, etc.) and the like.

Selectively grafted to the rubber substrate are comonomers selected from the group consisting of $C_1-C_8$ alkyl acrylates, $C_1-C_8$ alkyl methacrylates or mixtures thereof. When mixtures are employed, the comonomers have, as a major portion, $C_1-C_8$ alkyl acrylates, e.g., methyl, ethyl, propyl, butyl, 2-ethyl hexyl, stearyl hydroxyether and tertiary butylaminoacrylates, or $C_1-C_8$ alkyl methacrylates, e.g., methyl, ethyl, propyl, butyl, octyl and lauryl methacrylate: and a minor proportion of one or more vinyl monomers. Exemplary vinyl monomers include styrene: acrylonitrile; vinyl acetate; methyl methacrylate; ethylenically unsaturated carboxylic acids such as, for example, acrylic, methacrylic, itaconic and maleic acids; isoprene; chloroprene: 1,3-butadiene; propylene: ethylene; and other common vinyl monomers.

Because of their compatibility to vinylidene chloride interpolymers, preferred comonomers are methyl methacrylate and ethyl methacrylate, or mixtures comprising at least 50 percent of the methyl methacrylate and/or ethyl methacrylate. For the purposes of this application, methyl methacrylate and ethyl methacrylate are considered to have good compatibility with vinylidene chloride interpolymers because of a beneficial adhesion between the components.

Methods of forming the graft copolymer are well-known to those skilled in the art. A general description of methods suitable for the preparation of the graft copolymers are set forth in the *Kirk-Othmer Encyclopedia of Chemical Technology*, 3rd edition (1980).

In addition to the components of the polymeric polyblend compositions, the present invention may contain minor amounts of additives. A variety of additives may be added to the compatibilized blends of the present invention. Additive type and amount thereof will depend upon several factors. One factor is the intended use of the blends. A second factor is tolerance of the blends for the additives; that is, how much additive can be added before physical properties of the blends are adversely affected to an unacceptable level. Other factors are apparent to those skilled in the art of polymer formulation and compounding.

Additives which may be incorporated into the compatibilized blends of the present invention are selected from the group consisting of plasticizers, heat stabilizers, light stabilizers, pigments, processing aids, lubricants and the like. Each of these additives is known and several types of each are commercially available.

Methods of forming the compatibilizing polymers are well-known to those skilled in the art. A general description of methods suitable for the preparation of the compatibilizing polymers are set forth in the *Kirk-Othmer Encyclopedia of Chemical Technology*, 3rd edition (1980).

The compatibilized blends of the present invention are readily prepared by using conventional melt processing techniques for thermally sensitive polymers. Exemplary melt processing equipment includes heated two-roll compounding mills, Brabender mixers, Banbury mixers, single screw extruders, twin screw extruders and the like, which are constructed for use with thermally sensitive polymers. See, for example, the discussion by R. A. Wessling, in Chapter 11 of *Polyvinylidene Chloride*, Vol. 5, Gordon and Breach Science Publishers, New York (1977), the teachings of which are incorporated herein by reference. Desirable results are obtained when an extruder, either single screw or twin screw, is used for melt processing the compatibilized blends of the present invention. Beneficially, sufficient mixing must be generated during melt processing to provide a visually homogeneous blend with a reasonable mixing time.

In using conventional processing equipment for thermally sensitive polymers, two conditions should be met. The two conditions, which are interrelated, are processing time and processing temperature. In melt processing polymers, it is generally recognized that as processing temperatures increase, processing times must decrease in order to avoid undesirable results such as polymer degradation. This is especially true for vinylidene chloride interpolymers.

Melt processing must be accomplished at a temperature below that at which decomposition of the vinylidene chloride interpolymer becomes significant.

Sufficient mixing must be generated during melt processing to provide a visually homogeneous blend with a reasonable mixing time. Vinylidene chloride interpolymers may be melt processed at temperatures of up to about 200° C. provided processing time is less than about one minute. Temperatures greater than about 200° C. may be employed provided the processing time is sufficiently short and provided the vinylidene chloride interpolymer is not in contact with iron or other metallic elements known to catalyze the degradation of vinylidene chloride interpolymers. For example, vinylidene chloride interpolymers are melt processible at temperatures as high as about 230° C. at processing times of less than about ten seconds when the vinylidene chloride interpolymer forms an inner layer in a coextruded structure.

One factor in determining satisfactory mixing times is the melt index of the components of the compatibilized blend. If component melt indexes are nearly equal, a relatively short mixing time yields satisfactory results. If there is a disparity among component melt indexes, a longer mixing time is necessary.

A second factor in determining satisfactory mixing times is mixing shear rate. All other parameters being equal, a relatively low shear rate is needed when the components have a relatively low viscosity or a high melt index. Conversely, a relatively high shear rate is needed when the components have a relatively high viscosity or a low melt index.

A third factor in determining satisfactory mixing times is temperature. As noted hereinbefore, an upper limit on temperature is the temperature at which decomposition of the vinylidene chloride interpolymer becomes significant. A lower limit on temperature is dictated by the polymer blend component which has the greatest melting point. If the temperature does not exceed the melting point of that polymer blend component, a visually homogeneous melt will be difficult, if not impossible, to obtain.

A fourth factor in determining satisfactory mixing times is mixing efficiency of the melt processing equipment. Certain melt processing equipment mixes more efficiently than other melt processing equipment. Selection of melt processing equipment which will produce a visually homogeneous melt within a reasonable processing time is, however, not difficult and can be accomplished without undue experimentation.

A fifth factor in determining satisfactory mixing times is polymer feed form. The polymeric components of the compatible blends are generally available either in finely divided powder form or in pellet form. Either form is suitable for purposes of the present invention.

The polyblend compositions of the present invention can be used to form a variety of films or other articles. Films and other articles are conventionally prepared by casting, blowing, extrusion molding, injection molding, blow molding, coextrusion or conventional lamination processes, or calendering techniques.

More specifically, the polyblend compositions of the present invention can be used to form relatively rigid containers used for the preservation of food, drink, medicine and other perishables. Such containers should have good mechanical properties, as well as low gas permeabilities to, for example, oxygen, carbon dioxide, water vapor, odor bodies or flavor bodies, hydrocarbons or agricultural chemicals. Most organic polymers such as the polyolefins, styrene polymers and the like, by themselves, do not possess sufficient resistance to transmission of atmospheric gases and vapors. Consequently, multilayer sheet structures employed in packaging materials have organic polymer skin layers laminated on each side of the polymeric polyblend barrier layer, generally with glue layers used to promote adhesion between the barrier layer and dissimilar material layers. As is well-known in the art, such laminated structures are fabricated with conventional injection molding, extrusion molding, coextrusion or conventional lamination processes, or similar techniques.

Finally, halogenated polymers including vinyl halides and vinylidene chloride and the like, have long been known for their good ignition resistant properties. Thus, the compatibilized polyblends of the present invention have potential uses in the wire and cable industry and for business machine housings. Such polyblends have the advantage of not requiring the incorporation of additional FR additives to provide enhanced ignition resistance.

The present invention is illustrated in further detail by the following examples and comparative examples. The examples and comparative examples are for purposes of illustration only and are not to be construed as limiting the scope of the present invention. All parts and percentages are by weight unless otherwise specifically noted.

EXAMPLES

The polyblend compositions according to the present invention are prepared with various polymeric components. Each of the polymeric components used in the examples and comparative examples are coded and described hereinafter at Table I below.

The polyblend compositions are prepared in the following manner: each of the polymeric components, being in pellet form, are dry blended as described below to form a visually uniform admixture.

The polyblends are formed by melt blending an admixture of the vinylidene chloride interpolymer, PVC and compatibilizing resin in an extruder. The extruder is a 5.08 centimeter Single Screw Hartig extruder. The extruder has a length to diameter ratio of 12:1 The extruder has the following set temperatures: (a) hopper temperature = 160° C.; (b) melt zone temperature = 170° C.; and (c) die temperature = 185° C.

TABLE I

| Code | Polymer Components<br>Polymer |
|---|---|
| PVDC | A resin containing 98% of a vinylidene chloride copolymer, 1% epoxidized linseed oil and 1% Citroflex A-4, an acetyl tributyl citrate commercially available from Morflex Chemical Company. The vinylidene chloride copolymer has 80% vinylidene chloride and 20% of vinyl chloride polymerized therein. The copolymer has a melting point of 162° C. and a weight average molecular weight of 80,000. |
| PVC | A polyvinyl chloride copolymer commercially available from the B.F. Goodrich Co. under the trade designation GEON 86 Vinyl. The copolymer had an inherent viscosity (ASTM D-1243) of 0.66–0.70. |
| S/MMA | A styrene/methyl methacrylate copolymer having polymerized therein 44 percent styrene and 56 percent methyl methacrylate, both percentages being based upon copolymer weight. The copolymer had a melt index (ASTM Test D-1234) of 9.3 grams per ten minutes and a density (ASTM D-1505) of 1.11 grams per cubic centimeter. The copolymer is commercially available under trade designation P$_2$O$_5$-UV-81, from Richardson Chemicals. |
| BA/MMA | A graft copolymer having 20% methyl methacrylate grafted to 80% butyl acrylate rubber. |

TABLE I-continued

| Code | Polymer Components<br>Polymer |
|---|---|
|  | The graft copolymer is commercially available under trade designation KM-330, from Rohm and Haas Chemical Co. |
| PETG | A copolymer of a polyol component, e.g., cyclohexanedimethanol and ethylene glycol and of a dibasic acid, e.g., terephthalic acid. The copolymer has a density (ASTM D-1505) of 1.27 grams per cubic centimeter. The copolymer is commercially available under trade designation PETG 6763, from the Eastman Chemicals Co. |
| CPE | A chlorinated polyethylene polymer having a chemically combined chlorine content of 36 percent by weight of polymer, and a nominal melt viscosity of about 26,000 poise. Melt viscosity was determined using a capillary rheometer at a temperature of 190° C., a shear rate of 145 reciprocal seconds and a capillary size of 0.127 by 5.08 centimeters. The polymer is commercially available from The Dow Chemical Company under the trade designation CPE-3615. |

The vinylidene chloride interpolymer, PVC resin and compatibilizing polymer are blended in varying ratios. The ratios are set forth in Table II.

Preparation of Molded Samples

Mold samples to test the physical properties of the compositions of this invention are prepared as follows. Various combinations of the polymer components are prepared into pellets and subjected to physical property testing which is described below.

The polyblend composition components are added to an extruder hopper and thereafter converted to a molten polyblend within the extruder. The molten polyblend is extruded through a single strand die, passed through a water bath and then pelletized. The strand die had an internal diameter of 0.32 centimeters. Pelletizing is accomplished using a Model 304, 15.24 centimeter Strand Cutter commercially available from Conair, Inc. The pellets are then compression molded to prepare test specimens according to ASTM 256, Method A.

The physical properties of the samples are measured and reported in Table II.

TABLE II

| Sample No. | Polymer Code[1] | Component Amount[2] | % Tensile Yield[3] | % Tensile Rupture[4] | % Elongation[5] | % Modulus[6] (T × 10$^5$) | Notched Izod Impact Strength[7] | PO$_2$[8] |
|---|---|---|---|---|---|---|---|---|
| 1 | PVDC | 62 | 4550 | 3140 | 118 | 2.78 | 0.68 | 1.7 |
|   | PVC | 28 |  |  |  |  |  |  |
|   | PETG | 10 |  |  |  |  |  |  |
| 2 | PVDC | 62 | 3500 | 3120 | 319 | 1.36 | 1.08 | 2.3 |
|   | PVC | 28 |  |  |  |  |  |  |
|   | CPE | 10 |  |  |  |  |  |  |
| 3 | PVDC | 62 | 4510 | 4430 | 5.1 | 2.8 | 0.56 | 2.5 |
|   | PVC | 28 |  |  |  |  |  |  |
|   | STY/MMA | 10 |  |  |  |  |  |  |
| 4 | PVDC | 62 | 3320 | 3070 | 110 | 1.52 | 1.15 | 3.0 |
|   | PVC | 28 |  |  |  |  |  |  |

| Sample No. | Polymer Code[1] | Component Amount[2] | % Tensile Yield[3] | % Tensile Rupture[4] | % Elongation[5] | % Modulus[6] (T × 10⁵) | Notched Izod Impact Strength[7] | PO₂[8] |
|---|---|---|---|---|---|---|---|---|
| | BA/MMA | 10 | | | | | | |

[1] Polymer components as set forth in Table I.
[2] Amounts are in percentages based upon weight of blend.
[3] Tensile Yield (Ty) measures the yield strength of the sample in pounds per square inch. Ty is determined according to American Society of Testing and Materials Test Method D-638 at 0.2 inches/min.
[4] Tensile Rupture (Tr) measures the tensile strength upon failure of the sample in pounds per square inch. Tr is determined according to American Society of Testing and Materials Test Method D-638 at 0.2 inches/min.
[5] Percent Elongation (% E) measures the elongation to failure of the sample in percent. % E is determined according to American Society of Testing and Materials Test Method D-638 at 0.2 inches/min.
[6] Modulus (Tm × 105) measures the modulus of the sample in pounds per square inch. Tm × 105 is determined according to American Society of Testing and Materials Test Method D-638 at 0.2 inches/min.
[7] Notched Izod Impact Strength measures the toughness of the samples which contain a notch, in foot pounds per inch notch. notched Izod Impact Strength is determined according to American Society of Testing and Materials Test Method D-256, Method A.
[8] Oxygen Permeability (PO2 in (cubic centimeters of oxygen) (mil of sample thickness)/100 square inches (day)(atmosphere of pressure). PO2 of the test specimens is measured on an instrument commercially available from Model Controlled Inc. under the trade designation OXTRAN 1050.

As can be seen from the above table, the compositions of the present invention possess a good balance of physical properties.

What is claimed is:

1. A compatibilized polymeric polyblend composition comprising:
    (A) from about 40 to about 95 weight percent of a vinylidene chloride interpolymer, the interpolymer being formed from a monomer mixture comprising vinylidene chloride in an amount of from about 60 to about 98 weight percent, said weight percents being based on the total weight of the monomer mixture, and at least one monoethylenically unsaturated monomer copolymerizable therewith in an amount of from about 40 to about 2 weight percent, based on the total weight of the monomer mixture;
    (B) a polyvinyl halide formed from a monomer mixture of at least 50 weight percent of a halo-substituted ethylenically unsaturated monomer, with the balance being an ethylenically unsaturated monomer copolymerizable therewith; and
    (C) a compatibilizing amount of a compatibilizing polymer, said compatibilizing polymer being selected from the group consisting of (1) olefin polymers having halogen chemically affixed thereto in an amount of from about 24 to about 44 percent by weight of polymer; (2) a polymer formed from a monomer mixture having between about 65 weight percent to about 40 weight percent of vinyl aromatic monomers and between about 35 to about 60 weight percent of at least one ethylenically unsaturated mono- or polybasic carboxylic acid and derivative thereof, said weight percentages being based upon the total weight of the monomer mixtures; (3) a thermoplastic copolyester resin, said thermoplastic copolyester resin being formed from an acidic component, comprising one or more dibasic acid and a polyol component comprising more than one polyhydric alcohol, said polyhydric alcohols having a molecular weight of less than about 300; and (4) a thermoplastic graft copolymer of a rubber substrate and at least one comonomer on the substrate, the substrate having a rubber glass transition temperature below 0° C., and the monomer selected from the group consisting of $C_1$-$C_8$ alkyl acrylates and $C_1$-$C_8$ alkyl methacrylates, provided that the monomer selected is different from the major monomeric component of the rubber substrate.

2. The compatibilized polymeric polyblend composition of claim 1, wherein the monomer or monomers copolymerizable with the vinylidene chloride monomer are selected from the group consisting of vinyl chloride, alkyl acrylates, alkyl methacrylates, acrylic acid, methacrylic acid, itaconic acid, acrylonitrile, and methacrylonitrile.

3. The compatibilized polymeric polyblend composition of claim 1, wherein the polyvinyl halide is polyvinyl chloride.

4. The compatibilized polymeric polyblend composition of claim 1, wherein the polyvinyl halide is present in an amount of between about 2 to about 40 weight percent, said weight percents being based on the weight of the polyblend.

5. The compatibilized polymeric polyblend composition of claim 4, wherein the polyvinyl halide is present in an amount of between about 5 to about 30 weight percent, said weight percents being based on the weight of the blend.

6. The compatibilized polymeric polyblend composition of claim 1, wherein the olefin polymers having halogen chemically affixed thereto are selected from the group consisting of ethylene and propylene.

7. The compatibilized polymeric polyblend composition of claim 1, wherein the vinyl aromatic monomers are selected from the group consisting of styrene; α-alkyl vinyl monoaromatic compounds; ring-substituted alkyl styrenes: ring-substituted halostyrenes; ring-alkyl, ring-halo-substituted styrenes: vinylnaphthalene; and vinylanthracene.

8. The compatibilized polymeric polyblend composition of claim 7, wherein the α-alkyl vinyl monoaromatic compounds are selected from the group consisting of α-methylstyrene, α-ethylstyrene, α-methylvinyltoluene and α-methyldialkyl styrene.

9. The compatibilized polymeric polyblend composition of claim 7, wherein the ring-substituted alkyl styrenes are selected from the group consisting of ortho-, meta-, and para-vinyl-toluene, o-ethylstyrene, p-ethylstyrene, 2,4-dimethylstyrene and p-tert-butylstyrene.

10. The compatibilized polymeric polyblend composition of claim 7, wherein the ring-substituted halostyrenes are selected from the group consisting of o-chlorostyrene, p-chlorostyrene, o-bromostyrene and 2,4-dichlorostyrene.

11. The compatibilized polymeric polyblend composition of claim 7, wherein the ring-alkyl, ring-halo-substituted styrenes are selected from the group consisting of 2-chloro-4-methylstyrene and 2,6-di-chloro-4-methylstyrene.

12. The compatibilized polymeric polyblend composition of claim 1, wherein the ethylenically unsaturated mono- or polybasic carboxylic acid of (C)(2) are selected from the group consisting of acrylic acid, methacrylic acid, crotonic acid, fumaric acid, maleic acid and itaconic acid.

13. The compatibilized polymeric polyblend composition of claim 1, wherein the thermoplastic copolyester is formed from an acidic component selected from the group consisting of terephthalic acid and a mixture of terephthalic acid and one or more dibasic acids other than terephthalic acid: and a polyol component comprising ethylene glycol and at least one glycol other than ethylene glycol.

14. The compatibilized polymeric polyblend composition of claim 13, wherein the thermoplastic copolyester is formed from an acidic component comprising terephthalic acid and a polyol component comprising ethylene glycol and 1,4-cyclohexane dimethanol.

15. The compatibilized polymeric polyblend composition of claim 14, wherein the thermoplastic copolyester is poly(ethylene-co-1,4-cyclohexanedimethylene terephthalate).

16. The compatibilized polymeric polyblend composition of claim 1, wherein the rubber substrate is selected from the group consisting of acrylate rubbers, diene rubbers, olefin rubbers, and silicone rubbers.

17. The compatibilized polymeric polyblend composition of claim 1, wherein the acrylate rubber substrate is selected from the group consisting of ethylacrylate, butylacrylate, 2-hexyl acrylate, 2-ethylhexylacrylate and methylmethacrylate.

18. The compatibilized polymeric polyblend composition of claim 1, wherein the comonomer is a $C_1$–$C_8$ alkyl acrylate selected from the group consisting of methyl acrylate, ethylacrylate, propylacrylate, butylacrylate, 2-ethyl hexylacrylate, stearylacrylate, hydroxyetheracrylate and t-butylaminoacrylate.

19. The compatibilized polymeric polyblend composition of claim 1, wherein the comonomer is a $C_1$–$C_8$ alkyl methacrylate selected from the group consisting of methyl methacrylate, ethyl methacrylate, propyl methacrylate, butyl methacrylate, octyl methacrylate and lauryl methacrylate.

20. The compatibilized polymeric polyblend composition of claim 1, wherein the comonomer is polymerized with minor proportions of at least one vinyl monomers.

21. The compatibilized polymeric polyblend composition of claim 20, wherein the vinyl monomers are selected from the group consisting of styrene, acrylonitrile, vinyl acetate, methyl methacrylate, ethylenically unsaturated carboxylic acids, isoprene, chloroprene, 1,3-butadiene, propylene and ethylene.

22. The compatibilized polymeric polyblend composition of claim 21, wherein the ethylenically unsaturated carboxylic acid is selected from the group consisting of acrylic, methacrylic, itaconic and maleic acids.

23. The compatibilized polymeric polyblend of claim 1, wherein the compatibilizing polymer is present in an amount of between about 3 to about 30 weight percent, said weight percents being based on the weight of the blend.

24. The compatibilized polymeric polyblend of claim 23, wherein the compatibilizing polymer is present in an amount of between about 5 to about 20 weight percent, said weight percents being based on the weight of the blend.

25. The compatibilized polymeric polyblend of claim 26, wherein the compatibilizing polymer is present in an amount of between about 7 to about 12 weight percent, said weight percents being based on the weight of the blend.

* * * * *